Nov. 6, 1962 I. GOTH 3,062,419
COMBINED DISPENSING AND SEALING DEVICE FOR CONTAINERS
Filed Nov. 1, 1960 3 Sheets-Sheet 1
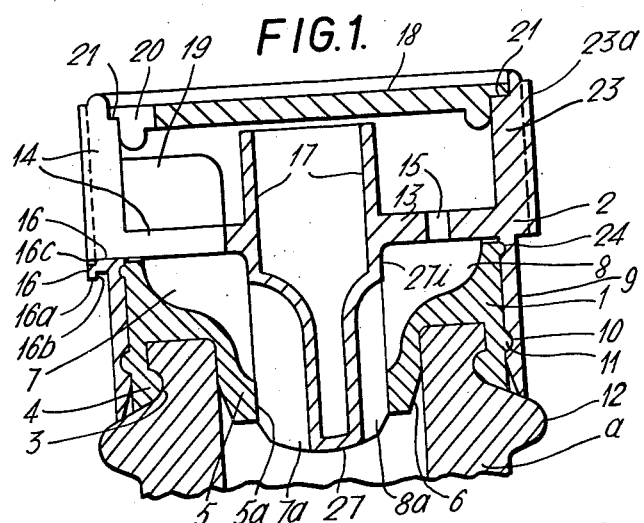
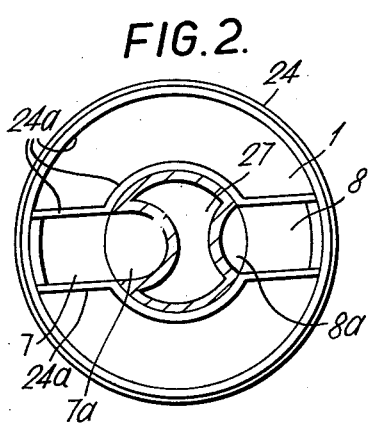
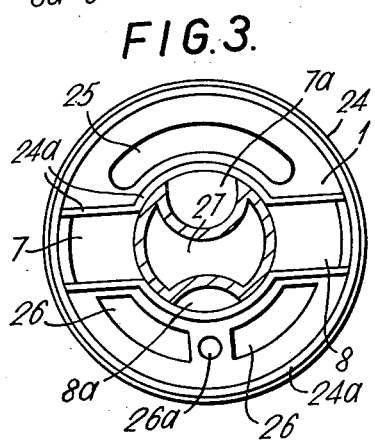
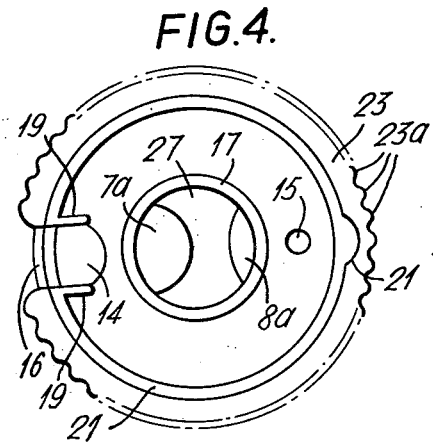
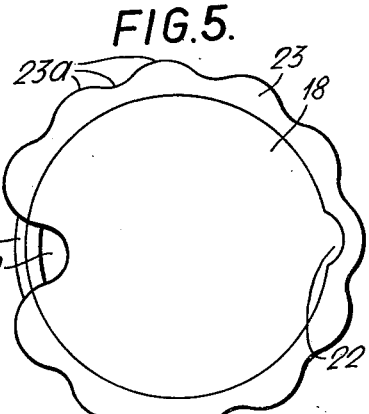
INVENTOR
IMRE GOTH
BY Hane and Nydick ATTORNEYS

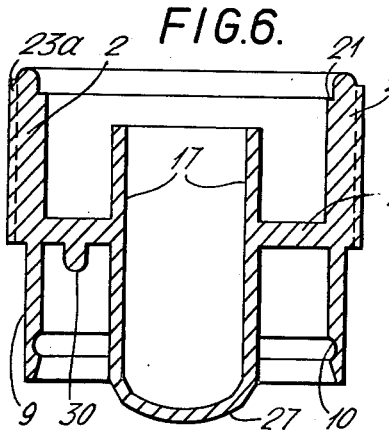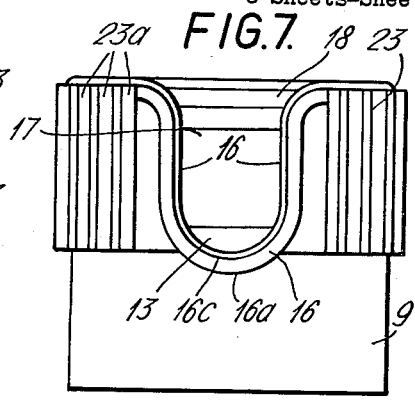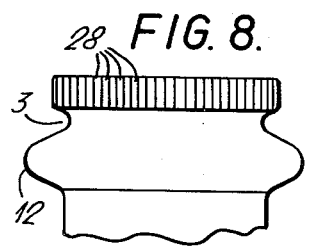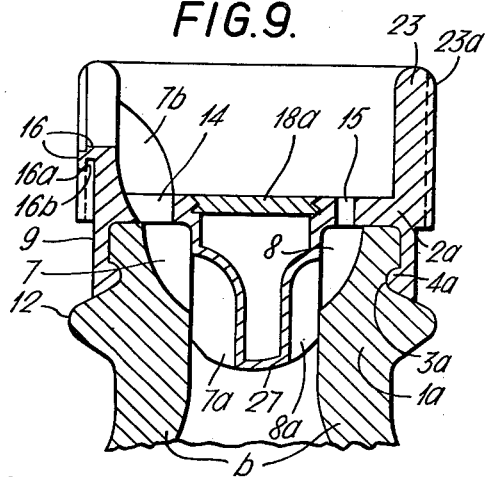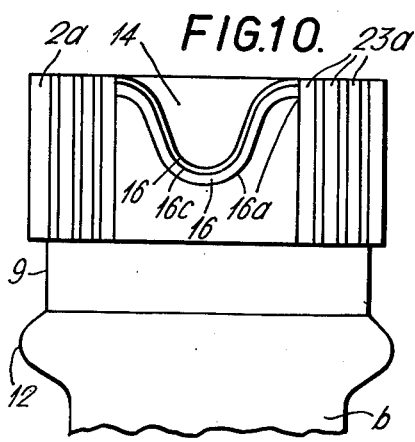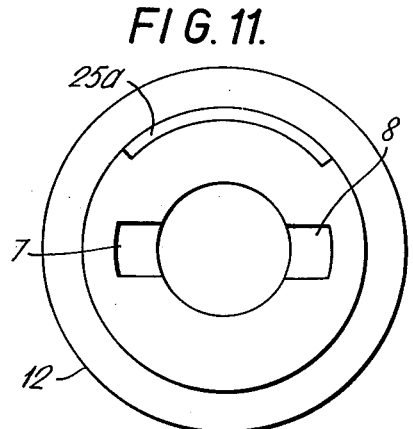

Nov. 6, 1962     I. GOTH     3,062,419
COMBINED DISPENSING AND SEALING DEVICE FOR CONTAINERS
Filed Nov. 1, 1960     3 Sheets-Sheet 3
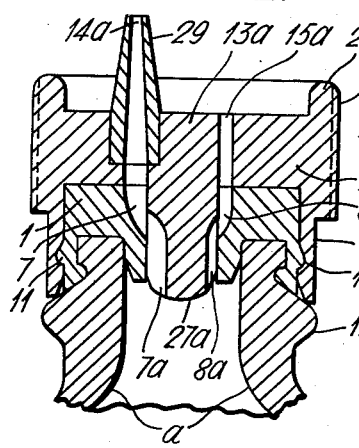
FIG. 12.
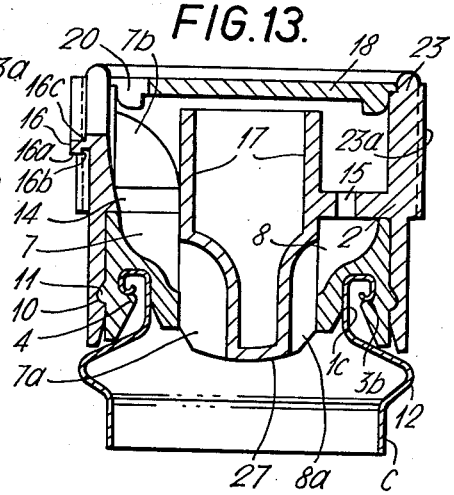
FIG. 13.
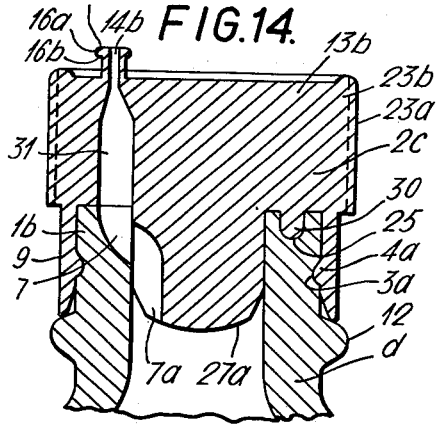
FIG. 14.
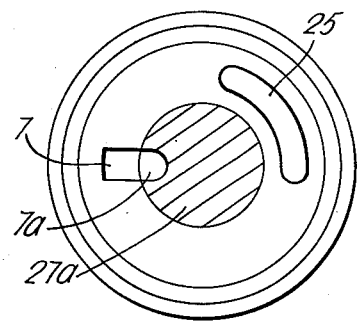
FIG. 15.
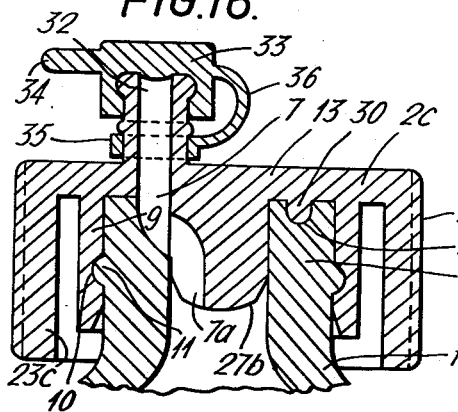
FIG. 16.
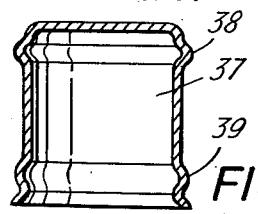
FIG. 17.
FIG. 18.
INVENTOR
IMRE GOTH
Hane and Nydick
ATTORNEYS United States Patent Office
3,062,419
Patented Nov. 6, 1962

3,062,419
COMBINED DISPENSING AND SEALING DEVICE FOR CONTAINERS
Imre Goth, 29 Addison Road, London W. 14, England
Filed Nov. 1, 1960, Ser. No. 66,646
Claims priority, application Great Britain Nov. 27, 1959
12 Claims. (Cl. 222—484)

This invention relates to a combined pouring and/or drop-dispensing or general dispensing and sealing device.

Containers sealed by a screw-cap have the disadvantage of tiresome manipulations with unscrewing and rescrewing the sealing cap, which may also get sometimes stuck to the thread of the neck by a dried sticky substance, as some of the liquid, adhering to the inside portion of the cap, flows after unsealing to the thread portion of the same and is transferred to the neck at resealing of the container. Although pouring devices, published in my British specifications Nos. 792,301 and 792,302 provide for spill- and drip-proof pouring of liquids of all surface tensions, they are designed to be used in conjunction with screw or press-cap sealing of the container, and therefore said devices lose some of their functional value due to the above-mentioned disadvantage of cap-sealing. Syrup based liquid transferred by the sealing-cap to the neck may crystallise there, rendering thereby the neck not only unsightly, but also greatly hindering an easy unsealing and resealing of the container. In addition, a screw-cap made of thermo-plastics is usually brittle and may break in transit or by being forced at the threads of the neck.

One object of the present invention is to eliminate the above mentioned disadvantages of sealing methods generally in use and to provide not only for a simple and comfortable unsealing and resealing of containers, but also for spill- and drip-proof dispensing of all liquid substances without transferring any liquid to the neck of the container, preserving thereby the outer surfaces of the same in a dry condition.

Another object of the invention is to provide at the same time for a safe sealing of the container, making thereby the device suitable for commercial packaging of liquids and other substances.

The above objects are achieved by arranging a combined pouring and/or drop dispensing or general dispensing and sealing device consisting of two members at least one of which is made of resilient materials, in such a manner that the first member is embodied in the suitably arranged neck of the container itself or consists of a separate unit made of resilient materials and provided with means to be firmly secured to a suitably shaped neck by snap action, said unit penetrating at the same time with a hollow cylindrical portion into the aperture of said neck and making liquidtight contact with the same, said first member being provided at its inside portion with one or two upwardly and outwardly projecting channels of suitable dimensions and the outer portion of the same is arranged with suitable means for adapting by snap action a suitable shaped sleeve or the like of the second member, said second member being provided with a centrally arranged stopper penetrating into the cylindrical aperture of said first member to a suitable distance below the starting level of said channel or channels of said first member, said stopper being provided with one or two upwardly projecting channels of suitable dimensions, said channels communicating at their starting level with the interior of the container and terminating at a suitable distance below the top end or root of said stopper, said second member being provided with a suitable aperture for outlet of the contents of the container and—in case a second channel is arranged—with an air-inlet aperture, each of said apertures communicating with the corresponding channels in the unsealed position of the device, said second member being adapted to be rotated in and around said first member either into a position, in which the channels of both said members and the corresponding apertures of said second member coincide, thus into the unsealed position, or in which said channels are separated in a liquidtight manner, thus into the sealing position of the device, the rotation of said second member being preferably arrested in the desired positions by suitable means, and—in case the device is made for dispensing of liquid substances— said outlet for the contents is provided with suitable pouring means, and wherein said second member is optionally secured to the container's neck by additional means, such as a safety lock or the like.

The invention may be carried out in a variety of manners according to the purpose and the contents of the container to which the device is to be applied, and the container itself may be made of any suitable material such as glass, ceramics, plastics, rubber or metals.

When the first member of the device is not incorporated into the neck of the container, both members may be made of any suitable materials, preferably resilient plastics, such as Polyethylene or the like.

The device may be additionally secured to the neck of the container by a "pilfer-proof" safety lock, made of thin metals or being protected by a viscous cap or a cap made of resilient plastics and secured to the neck by snap action, in order to prevent said second member from being rotated before removing said lock or protection.

For a better understanding of the invention and to show how it may be carried into effect, the same will now be described by way of examples with reference to the accompanying drawings, in which:

FIGURE 1 is a cross-sectional view of a bottle neck and the combined device in the unsealed position, both members of the device being made of resilient materials, FIGURE 2 shows a vertical projection of the channels of both members in the unsealed position of the device, FIGURE 3 is a top view of the first member, showing at the same time in the vertical projection the location of the channels of the second member in the sealed position of the device, FIGURE 4 is a top view of the second member, FIGURE 5 is a top view of the second member in an alternative execution of the rim of the device with a top disc applied to said member, FIGURE 6 is a cross-sectional view of the second member, FIGURE 7 is a front elevation of the assembled device, FIGURE 8 is a front elevation of a bottle neck, FIGURE 9 is a cross sectional view of a bottle neck incorporating the first member of the device and the second member applied to said neck, FIGURE 10 is a front elevation relating to FIG. 9, FIGURE 11 is a top view of the first member relating to FIG. 9, FIGURE 12 is a cross-sectional view of a bottle neck and the combined device of an alternative execution, FIGURE 13 is a cross-sectional view of the neck of a tin or drum or the like made of metals with the combined device applied to the same, FIGURE 14 is a cross-sectional view of a bottle neck, incorporating the first member, with the second member of an alternative execution applied to the same, FIGURE 15 is a top view of the first member relating to FIG. 14, showing the location of the channels in the unsealed position of the device.

FIGURE 16 is the cross-sectional view of the neck of a flexible tube or the like, incorporating the first member with an alternative execution of the second member of the device, FIGURE 17 is a cross-sectional view of a protecting cap and, FIGURE 18 is a perspective of a safety lock.

In the drawings identical or similar parts of the device are provided with the same references.

The first member 1 (FIGURES 1, 2 and 3), made of resilient plastics, penetrates with its hollow cylindrical portion 5 into the neck *a* of a bottle, said portion making a liquidtight contact with the inside surface of said neck. Said first member is provided with an inwardly protruding annular ledge 4 or the like of suitable shape and dimensions, which ledge is sprung into the annular recess 3 of said neck and holds said first member firm at the neck. The hollow cylindrical portion 5 is suitably provided at the bottom portion of its outer surface with a tapering 6 in order to ease the application of said member to the neck. Said first member is provided with a liquid-outlet channel 7 and an air-intake channel 8 preferably at diametrically opposing portions of the same, said channels starting at such suitable distance from the bottom end of the cylindrical portion 5 that an intact cylindrical portion 5a of suitable dimensions is spared for liquidtight sealing of the container by the stopper 27 of the second member 2, when the same is in the sealing position. Said channels 7 and 8 terminate at the top surface of the first member 1 at a suitable distance from the perimeter of the same. Said first member is also provided at its outer surface with an outwardly protruding annular ledge 11 or the like, which is sprung into the annular recess 10 of the sleeve 9 of the second member, when the same has been brought into position. The second member 2 is provided with a substantially horizontal disc 13 of suitable thickness, at which disc the stopper 27, the said sleeve 9 and an upwardly projecting hollow cylindrical body 23 are based. In the present example the stopper 27 is arranged with a hollow inside and is provided with two upwardly projecting channels 7a and 8a arranged at substantially diametrically opposing portions of said stopper in such a manner, that said channels communicate at their starting level with the interior of the container and terminate, preferably in an arcuate manner, at such a suitable distance from the top end or root of the stopper, that a large enough cylindrical portion 27i of said stopper is preserved in an unintersected condition to make liquidtight contact with the cylindrical inside surface of the first member 1. The stopper 27 is arranged to penetrate into the aperture of said first member to such a depth, that said stopper is enabled to make liquidtight contact with the intact cylindrical portion 5a of said first member in the sealing position of the device. In the present example the channel 7a of said stopper is arranged for the outlet of liquid and the channel 8a for the intake of air. The disc 13 of the second member abuts upon the top surface of the first member and is provided with an aperture 14 for the outlet of liquid and an aperture 15 for intake of air, both said apertures being arranged in such a manner that each of them communicates with the corresponding channels 7, 7a and 8, 8a of said first member, when the device is in the unsealed position.

The disc 13 is connected with an upwardly protruding cylindrical body 23 (FIGURES 1, 4, 5, 6 and 7), which is provided at its outer portion with suitable serrations 23a or any other suitably shaped surface facilitating a good grip for the fingers in order to enable to rotate the second member 2 in and around the first member 1 either into the sealing position, when the channels 7, 7a, 8 and 8a of both said members are separated, as shown in FIGURE 3, or into the unsealed position, when all said channels coincide and communicate with each other and with both said apertures as shown in FIGURES 1 and 2. In the position, in which said channels are separated, the intact cylindrical portion 5a of the first member is contacting the unintersected cylindrical portions of the stopper 27 and the intact cylindrical portion 27i of the latter is contacting the unintersected cylindrical portions of the first member, sealing thereby the container.

The channels of both said members may be arranged in such dimensions as required for the contents of the container and the speed of dispensing, such as pouring or drop-dispensing. When, however, the channels are arranged for pouring, it is possible to use the same device for drop-dispensing of liquids in all pouring positions of the container, when the second member is turned into such a position, that all said four channels only partially coincide, the communicating portions of the channels suitably restricting thereby the speed of outlet of liquid and intake of air.

In order to improve the appearance of the device, the cylindrical body 23 of the second member may be covered at or near to its top portion by a disc 18, which is sprung into a recess 21 arranged at or near to the inside top portion of said body, and the hollow inside of the stopper may be covered from sight through the pouring aperture 14 by an upwardly extended wall 17 of said stopper. The disc 18 covering the top portion of the device may be suitably provided with an aperture 20 in order to show clearly to the user the position of the pouring aperture 14 from the top view of the container. The disc 20 may be provided with a protrusion 22 of any suitable shape, preferably arranged at a portion of the disc opposite the aperture 20, said protrusion fitting into a suitable extension of recess 21. In this manner said disc can only be sprung into position when the protrusion of the same is fitted into said extension, and thereby the aperture 20 will coincide in its position with the vertical projection of the pouring aperture 14. Said disc may also be provided with a small air-inlet aperture, if required. At each side the pouring aperture 14 an upwardly protruding wall 19 of suitable shape may be arranged in order to prevent any of the poured liquid from spreading to the top surface of the disc 13.

The dimensions of the second member relative to the first member are defined in such a manner, that, in addition to liquidtight fitting of said two members, an effortless rotation of the second member in and around the first member is ensured. In order to reduce friction, the contacting surfaces of both members are preferably made in a highly polished execution and the vertical edges of all channels are suitably provided with a small radius.

In order to increase the grip of the first member at the bottle neck *a* (FIGURE 8), any of the suitable surfaces of said neck may be provided with grooves and/or protrusions 28 or the like arranged in suitable dimensions and directions in order to increase the firmer fitting of said first member at said neck, preventing thereby said member from moving around said neck, when the second member is rotated. The corresponding surfaces of said first member contacting the serrated surfaces of said neck may be suitably provided with surfaces of similar structure to that of said neck. The rotation of the second member 2 (FIGURE 6) may be arrested in the sealed and unsealed positions of the device by a peg 30 (FIGURE 6) or the like fitting into an arcuately extended groove 25 (FIGURE 3) arranged at the top portion of the first member, said peg being arrested at both ends of said groove. The arresting of the second member in the desired positions may, however, be arranged in any other suitable manner, e.g., an arrangement may be provided, whereby suitable parts of both members click or snap in, when the second member is in the sealed and/or unsealed positions.

In order to achieve spill- and drip-proof pouring and/or drop-dispensing of liquids of all surface tensions, the pouring means of the device are suitably arranged in the following manner:

The pouring surface, consisting of two parts, is arranged at the second member 2 of the device, the first part 16 (FIGURES 1, 7, 9, 10, 13 and 14) of said surface being arranged outwardly adjoining the liquid-outlet aperture 14 in an outwardly and downwardly projecting direction, while the second part 16b of said surface is arranged in a substantially upwardly projecting direction in the upright position of the container, or at such an inclination that the same will be upwardly projecting in all pouring positions of the container (FIGURE 14), the meeting or merging area 16a of said first and second parts being arranged within the influence of capillary or backflow suction of channel 7 or 7b or the tubular dispensing outlet 14b (FIGURE 14). In order to achieve the suitable location of said merging area of said first and second parts in the area of said influence, the channel 7 terminates with its bottom wall at the top portion of the first member 1 at a suitably close distance from its outer perimeter, the centre portion of the first part 16 of said pouring surface being arranged at the pouring outlet 14 adjoining said perimeter. In order to prevent some poured liquid from entering between said perimeter and said first part, the outer surface of the first member may be provided with a small rib 24 fitting into a small groove arranged at the sleeve 9 of the second member. The pouring surface is suitably arranged all around and along the suitably shaped liquid-outlet aperture 14 in an all arcuate or arcuate and vertical (FIGURE 7) or arcuate and oblique (FIGURE 10) manner, said surface terminating at both sides of the top portion of said aperture preferably in an arcuate manner. It will be understood, that the above described directions of said first and second parts of the pouring surface relate in the latter arrangements only to the lowest centre portion and both top end portions of said surface, when the container is in the upright position. By arranging, however, the same cross-sectional shape and dimensions all along said pouring surface in a perpendicular manner to the direction of said surface drip-proof pouring is achieved even if the container is held at pouring in such a position that the centre portions of said surface is not projecting into the vertical direction relative to the air-inlet aperture 15. In the latter case the first and second parts of said pouring surface will project substantially in the above described directions at the particular portion of said surface, over which the poured liquid passes. In order to increase the adhesion of liquids at the first part of the pouring surface, securing thereby drip-proof pouring of liquids of very low surface tension, said first part may be provided with means for producing minor capillary attraction, such as one or more step-like shoulders 16c (FIGURES 1, 7, 9 and 13) or the like.

In order to prevent the poured liquid from penetrating between the top surface of the first member 1 and the bottom surface of disc 13 of the second member 2, said top surface may be provided with small upwardly protruding ribs 24a (FIGURES 2 and 3), particularly along the top edges of the channels 7 and 8.

The first member 1a (FIGURES 9, 10 and 11) may be incorporated into the neck b of the container itself, which may be made of glass, ceramics, plastics, or the like. The pouring outlet of said neck is provided with a liquid outlet channel 7 and an air-inlet channel 8, both said channels starting at a suitable level at the interior of said neck and terminating at the top surface of the same. Said neck is provided at its outer surface with an annular recess 3a, or the like, into which an annular ledge 4a of the sleeve 9 of the second member 2a may be sprung. When the container is made of glass, it may not be convenient to arrange the terminating bottom end of the liquid-outlet channel 7 at a suitably close distance to the outer perimeter of said neck from the glass manufacturing point of view. In order to arrange, however, the merging or meeting area 16a of the first part 16 and the second part 16b of the pouring surface of the second member 2a within the influence of the capillary or backflow suction of channel 7 and achieve thereby drip-proof pouring of liquids of all surface tensions, the pouring outlet 14 of said second member is suitably arranged in such a manner, that an upwardly projecting extension 7b of channel 7 is provided within said pouring outlet, the bottom surface of said extension terminating at the lowest or central level 16 (FIGURE 10) of the first part of the pouring surface, inwardly adjoining the same. The stopper 27 and other parts of the second member 2a are substantially similarly arranged to those of the second member 2 of FIGURE 1. In the present example the top of the hollow stopper is closed by a small disc 18a, sprung into a suitable recess arranged at the disc 13. The top portion of the neck b may be provided with an arcuate groove, similar to groove 25 as shown in FIGURE 3, into which groove a downwardly projecting peg of said second member penetrates, in order to arrest the latter in its rotation in the suitable positions. When, however, the container is made of glass, it may be more suitable from the glass manufacturing point of view to arrange a sector of the outer top perimeter of said neck with a suitably smaller diameter, creating thereby a recess 25a of suitable dimensions, and the sleeve 9 of the second member is provided with an inwardly protruding thickened portion of suitable dimensions, said portion arresting the second member in its rotation at both ends of said recess. The diameters and dimensions of the recess 3a and ledge 4a are arranged in such a manner, that in addition to a secure grip of sleeve 9 at the neck, an effortless rotation of said second member in and around said neck is ensured.

In an alternative execution of the combined device the second member 2b (FIGURE 12) is provided with an upwardly protruding tubular pouring outlet 14a, said pouring outlet communicating with the liquid-outlet channels 7, 7a, in the unsealed position of the device. In the present example the stopper 27a has no hollow inside, and a tube 29 of suitable length may be inserted into a suitably shaped cavity arranged in the relatively thick disc 13a, the air-inlet aperture 15a being arranged in a suitable manner at said disc. This arrangement is suitable for filling liquid into small apertures, e.g. filling lighters with petrol or filling oil into oiling apertures. The end position of said tubular outlet may be provided with an annular pouring surface.

The neck c (FIGURE 13) of a tin, drum or the like is made of sheet metal, and is arranged to have nearest to its upper end a hollow cylindrical top portion 1c of suitable length. At the top end of said portion the metal is turned outwardly and then downwardly to a suitable length and then inwardly or inwardly-upwardly again. In this manner an annular cavity or recess 3b is created, into which recess the inwardly protruding annular ledge 4 of the first member 1 of the device may be sprung. The present example of the combined device itself is of similar arrangement to the execution already described with reference to FIGURES 1, 2, 3, 4, 5, 6 and 7, with the exception, that the lowest centre portion of the pouring surface 16, 16a, 16b and 16c is arranged at a higher level, an extension channel 7b being provided in the liquid-outlet aperture 14, said channel directing the poured liquid to said pouring surface.

An alternative execution of the device is provided for containers made of resilient plastics, the contents of which are to be squeezed out. The neck d (FIGURES 14 and 15) incorporating the first member 1b of the combined device, is provided with a channel 7 of suitable dimensions, said channel starting at a suitable level at the inside portion of said neck and terminating at the top surface of the same. Said first member is also provided with an annular recess 3a, into which a suitable ledge 4a, arranged at the downwardly protruding sleeve 9 of the second member 2c, may be sprung. At the top portion of said first member an arcuate groove 25 may be arranged, into which a downwardly protruding peg 30 of said second member penetrates in order to arrest the rotation of the same in the suitable positions at both ends of said groove. Said second member is provided with a stopper 27a penetrating into the aperture of said first member to a suitable distance below the starting level of channel 7. Said stopper is provided with an upwardly projecting channel 7a, said channel communicating at its starting level with the interior of the container and terminating at such a suitable distance from the top portion of said stopper, that an unintersected cylindrical portion of the same may provide for liquid tight sealing of the container, when the device is in the sealing position. The pouring or "atomising" outlet 14b is arranged to communicate by a suitable passage 31 with both said channels of the first and second members in the unsealed position of the device. Said pouring outlet may be arranged at any suitable level above the top portion of the second member, and may be provided with a suitable pouring surface 16, 16a and 16b. In the present example of execution the thickened disc 13b and the stopper 27a of said second member are made solid. When, however, the diameter of the neck requires larger diameters of the device, suitable hollow portions may be arranged, in order to avoid excessive shrinkage of the material at setting.

The neck f (FIGURE 16) of the flexible tube or the like may be arranged to incorporate the first member 1c of the device. The arrangement is in principle similar to that illustrated in FIGURES 14 and 15, only in the present example said neck is provided with an annular ledge 11 and the downwardly protruding sleeve 9 of the second member 2c with an annular recess 10, into which recess said ledge may be sprung. Said second member is provided with a disc 13, at which the stopper 27b, said sleeve, the downwardly projecting peg 30 and the cylindrical portion 23c are based, which latter is arranged in the present example in a downwardly projecting manner and provided with serrations 23a or the like. The aperture 32 for outlet of the contents is arranged to communicate with both channels 7 and 7a in the unsealed position of the device. In order to prevent some substances, such as tooth paste or the like from drying into the outlet aperture 32, the same may be provided with additional outside sealing means, such as a captive stopper or cap 33 made of resilient materials and suitably connected by a hinge 36 to a ring 35 applied to the outer portion of said outlet in a known manner, and said cap may be secured to the outlet by snap action, a protruding tab 34 facilitating the removal of said cap. By arranging said additional outer sealing means the rotation of the second member into the sealed and unsealed positions may be spared in frequent use of the container.

When the first member 1, 1b (FIGURES 1, 3, 12, 13 and 14) is made of resilient plastics, the same may be provided at its top portion with suitably shaped and dimensioned cavities 26 (FIGURE 3) or the like, in order to prevent excessive shrinkage of the plastic material at setting.

When both of the above described members are made as separate units and are to be applied to the neck of a container, according to FIGURES 1-7, 12 and 13, said members are preferably assembled before their applications to the neck, and pressed upon and into the same as a single unit, particularly when the application of the devices to the necks of containers is to be automatically carried out by a machine on fast moving filling lines. It is, of course, essential to assemble said two members in the sealing position of the device for automatic application of the same to the neck, and in order to facilitate and/or ensure the correct assembling, any suitable means or methods of guide and control may be applied. E.g. the top portion of said first member may be provided at a suitable place with a ring-shaped cavity 26a (FIGURE 3) or the cavity 26 may be intersected by a plain top portion at the same location, said location coinciding with the air-inlet aperture 13 of said second member in the sealing position of the device.

When the first member of the device is incorporated into the neck of the container, said neck and/or container and the second member of the device may be provided with suitable protrusions and/or cavities for automatic selection and location of both members into the suitable position by a machine, which also provides for the application of the device.

In order to prevent the unsealing of the container in transit, the combined device may be protected by a cap 37 (FIGURE 17) made of resilient materials, said cap being provided near to its bottom portion with a suitably shaped annular recess 39, in order to secure said cap to the neck by snap action, said recess being sprung upon the annular ledge 12 (FIGURES 1, 9, 10, 12, 13 and 14) arranged at the neck of the container. Said cap may be replaced upon the device after its removal, in order to protect the same from dust.

Alternatively the combined device may be provided with a "pilfer-proof" security lock 40 (FIGURE 18), which is to be rolled under said ledge 12 of the neck at its application in a known manner. The security lock may be provided with a tap or grip 41, by which said lock may be torn off along a perforated or partially precut track 42.

In order to enable the automatic application of either said cap or security lock and combined device as a single unit in one operation, said cap or security lock may be arranged with suitable diameters in order to hold by friction the assembled device placed inside it. In order to facilitate selection of said unit by a machine, said cap or security lock may be provided by a suitably shaped annular protrusion 38 in a routine manner.

It will be understood that all arrangements described and illustrated in the above examples are interchangeable, and all suitable materials may be used for making the combined devices and/or containers and protective devices.

What I claim is:

1. A combined pouring and sealing device for a container having a neck comprising two members, a first member including an inner portion with an opening therein and two upwardly and outwardly projecting channels therethrough, an outer portion including means for securing said first member to the container with said inner portion in liquid-tight contact in the neck, said outer portion including means for movably securing a second member thereto, said second member including a stopper portion adapted to be movably received in said first member opening in liquid-tight contact, said stopper portion adapted to be movably received in said first member opening in liquid-tight contact, said stopper terminating a distance below said first member channels, two upwardly and outwardly projecting channels in said stopper adapted to communicate with said first member channels over a portion of the movable path of said second member, means in said members for controlling the distance said second member is movable, a pouring surface of said second member including converging outwardly and downwardly projecting portions and an upwardly projecting portion in one side thereof communicating with one channel thereof, said converging portion being adjacent to the top of said first member within the area of backflow suction of a liquid material flowing through said one channel of said second member and a communicating channel of said first member, a shoulder in said converging portions to increase the adhesive of the flowing liquid material, a rib member intermediate said first member and said converging portions to prevent the flowing liquid from entering therebetween.

2. A device according to claim 1, wherein the first member is made of a resilient material, and said means for firmly securing said first member to the neck of the container comprises an inwardly protruding annular ledge, said ledge being adapted to be sprung into an annular recess of an outer surface of the neck of the container, and said channels start at the inside of a hollow cylindrical portion of said first member at a distance from the bottom of said portion to preserve the bottom portion thereof in an unintersected cylindrical shape, said channels terminating at the top surface of said first member at a distance from the outer perimeter of the same.

3. A device according to claim 1, wherein said second member includes a substantially horizontal disc, said disc being connected with a downwardly projecting centrally arranged stopper, and a downwardly projecting sleeve connected to the sides of said disc having an inside diameter selected to have said sleeve adapted to be secured to said outer surface of said first member, said disc having an outlet aperture for material in the container and an air-inlet aperture, said apertures being arranged in the central diagonal projection of the channels of said stopper, said channels terminating at a distance from the top of said stopper to have a portion of the same preserved in an unintersected cylindrical shape for making liquid tight contact with the unintersected portion of the aperture of the first member when said second member is in a sealing position.

4. A device according to claim 1, wherein said first member includes at its outer surface with an annular ledge, said ledge being adapted to fit into an annular recess of an inner surface of a sleeve carried by said second member when said second member is fastened to said first member by snap action.

5. A device according to claim 1, wherein said first member includes at its top surface an arcuate groove adapted to receive a downwardly protruding member carried by said second member, said groove and members being adapted to control the rotational position of said second member.

6. A device according to claim 1, wherein said first member includes near to the top of its outer surface a small outwardly protruding rib, said rib fitting into a small recess arranged at the inside surface of a sleeve carried by said second member when said members are fastened together.

7. A device according to claim 2, wherein said first member on an outer surface thereof adapted to communicate with the neck of the container a plurality of serrations for holding said first member in liquid-tight contact with the container when said second member is moved with respect to said first member.

8. A device according to claim 1, wherein said second member includes an upwardly extended hollow cylindrical body, said body having at its outer surface serrations providing a comfortable grip to rotate said second member in and around the stationary first member.

9. A device according to claim 3, wherein the outlet aperture of said second member is terminated with a pouring surface.

10. A device according to claim 9, wherein said pouring surface includes two parts, the first part of which is outwardly and downwardly projecting, the second part of which is substantially upwardly projecting in an upright position of the container at such an inclination that said second part is upwardly projecting in all pouring positions of the container, said first and second parts converging at an area influenced by backflow suction of liquid flowing in an outlet channel formed by one of the first member channels communicating with a second member channel in the unsealed position of said members.

11. A device according to claim 10, wherein the first part of the pouring surface includes at least one step-like shoulder for increased adhesion of the liquid.

12. A device according to claim 1 including a sealing cap attached to said second member for closing said channels.

References Cited in the file of this patent

UNITED STATES PATENTS 2,839,227     Wilson et al. _____ June 17, 1958

FOREIGN PATENTS 360,480     Germany _____ Apr. 17, 1921